United States Patent [19]

McGuire

[11] Patent Number: 5,024,405
[45] Date of Patent: Jun. 18, 1991

[54] PIPE CLAMP

[76] Inventor: Robert H. McGuire, 991 S. Rutgers Cir., Anaheim, Calif. 92807

[21] Appl. No.: 351,052

[22] Filed: May 12, 1989

[51] Int. Cl.⁵ ............................................. F16L 3/08
[52] U.S. Cl. ................................. 248/73; 24/168 B; 24/458; 248/71; 248/74.1; 248/316.5
[58] Field of Search .............. 248/73, 71, 74.1, 74.2, 248/74.3, 67.7, 316.5, 316.7, 221.3, 221.4, 221.1, 222.2, 222.3, 231.5, 231.4; 24/16 PB, 17 AP, 457, 458, 336, 339

[56] References Cited

U.S. PATENT DOCUMENTS

| | | | |
|---|---|---|---|
| 3,913,187 | 10/1975 | Okuda | 24/16 PB X |
| 4,260,123 | 4/1981 | Ismert | 248/71 X |
| 4,291,855 | 9/1981 | Schenkel et al. | 248/74.1 |
| 4,352,478 | 10/1982 | Loen | 248/221.3 |
| 4,372,011 | 2/1983 | Aranyos | 24/16 PB X |
| 4,386,752 | 6/1983 | Pavlak et al. | 248/73 |
| 4,478,381 | 10/1984 | Pittion et al. | 248/74.1 X |
| 4,502,186 | 3/1985 | Clarke et al. | 24/16 PB |
| 4,550,451 | 11/1985 | Hubbard | 4/192 |
| 4,802,646 | 2/1989 | Cattani | 248/316.5 |
| 4,840,345 | 6/1989 | Neil et al. | 24/16 PB X |
| 4,881,301 | 11/1989 | Sweeney et al. | 24/16 PB X |

OTHER PUBLICATIONS

A catalog from Litchfield International, Inc. entitled CLIC ® The International System for Supporting and Hanging Pipes & Tubes Made from Plastic Metal Glass.
A catalog by IPS Corporation entitled Water-Tite ®.
Price List from LSP Specialty Products, dated 10-0-1-87.
A price list dated 2/1/73 for the Silent Glide Pipehanger Corp.
An ad for Sealtexcompany ®.
Brochure for "The Universal Support by Union Stamping". o
A brochure for Pipe-Tytes Inc.
A price list from LSP Specialty products Co., dated 5/1/88.
A price list for the Dallas Specialty & Mfg. Co.
An ad from C&S Manufacturing entitled "BASSET ® STUB OUT BARS".
A catalog by B-LINE SYSTEMS INC., entitled "Mechanical Support Systems by B-LINE ®".
A printout by SIOUX CHIEF Manufacturing Company, Inc.
An ad for HOLDRITE ®, "Get out of a Mickey-Mouse Situation just by Reading this flyer!".
A catalog for HOLDRITE ® BRACKETS, by Hubbard Enterprises.
A brochure for KWIK BLOCK ™, the K&P Products, Inc.
An enclosure from the UNION STAMPING CO., (6 pp).
A a flyer, FASTCO, undated.

Primary Examiner—Ramon O. Ramirez
Attorney, Agent, or Firm—Knobbe, Martens, Olson & Bear

[57] ABSTRACT

A pipe clamp having a pipe gripper affixed to a base is disclosed, wherein the base may selectively engage a support bar. The base includes a pair of feet and opposing clips which permit selective engagement of the pipe clamp to the support bar. The pipe clamp is initially oriented perpendicular to the support bar and a center pin is disposed in an aperture. The pipe clamp is then rotated to dispose the feet into apertures of the support bar and the clips engage the backside of the bar. The pipe gripper includes a tongue and a mating fork having a guide prong and securing prong, wherein interlocking teeth prevent displacement of the tongue from within the fork to thereby retain a pipe. The pipe is removed from the clamp through the separation of the tongue and the fork by flexing the guide prong in a radial direction so as to permit torsion of the tongue relative to the fork.

28 Claims, 1 Drawing Sheet

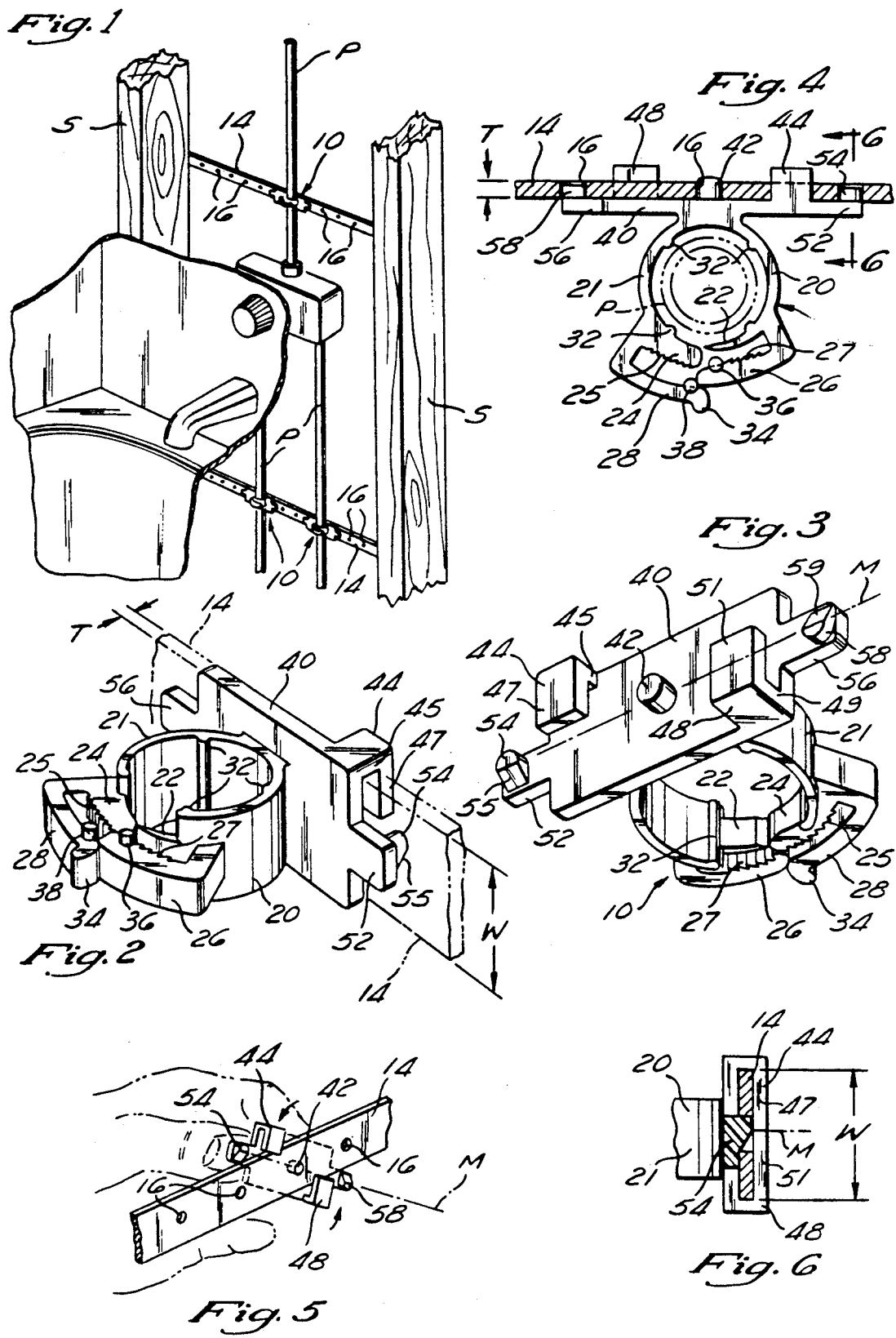

PIPE CLAMP

BACKGROUND OF THE INVENTION

This invention relates to a method and apparatus for securing pipes relative to a fixed structure. More particularly, the invention relates to a pipe clamp which selectively engages a support bar and encircles the circumference of a pipe to secure the pipe relative to the support bar.

DESCRIPTION OF THE PRIOR ART

The installation of piping systems occurs subsequent to the construction of the frame of a building. Wherever possible during the installation process, the piping is secured directly to the studs, beams or supports of the building framework. However, piping systems do not always follow the framework of the building. Therefore, spans, or lengths of piping are often unsupported. The weight of the pipe itself causes the pipe to flex or bend along the unsupported lengths. The additional loading upon fluid flow in the pipe causes further flexing. This flexure produces severe stress which can lead to the failure of pipe joints. Therefore, unsupported lengths of pipe must be braced to prevent the failure or degradation of pipe joints and fixtures. The intermediate support of the piping provides resistance to motion throughout the length of pipe, and thereby provides for a more secure piping system having an increased resistance to the failure of pipe joints and fixtures.

Prior attempts to brace an unsupported length of pipe have included the use of U-shaped members, wherein the pipe is disposed within the arcuate portion, and the ends of the U-clamp are secured to a support member. However, use of the U-clamps requires that the pipe extend proximal to a rigid support member. In addition, application of each U-clamp requires substantial labor, in that the pipe must be placed within the clamp and the clamp must be secured to the support member by means of separate fasteners. Therefore, an extensive use of such fittings results in an increased installation time and cost. To reduce the installation time, nails, rather than screws or bolts, are employed to secure the U-clamp to the support member. However, a U-clamp secured by nails is often rendered non-reusable as a result of damage incurred by removing the nails.

Another attempt to provide a readily attachable pipe clamp for an unsupported length of pipe is an open looped member comprised of a resilient material which is stressed to receive the pipe and retains the pipe by means of the force exerted by the stress. However, these members must be disposed proximal to a support structure, and oriented relative to the support structure in a predetermined orientation, thereby limiting the utility of the clamp. Further, upon the application of a radial force greater than the stress exerted by the resilient clamp, the open looped configuration releases the pipe. Therefore, the strength and orientation of the clamp, and the loading of the pipe must be separately accounted for in the design of the piping system.

A further attempt to provide a suitable pipe clamp has included a pair of opposing clamp members pivotally affixed to a base. The base is secured to a support structure by means of separate mechanical fasteners. A pipe is secured within the clamp by the common engagement of one end of the clamp members while the remaining ends remain free. This device is subject to the limitation that additional fasteners are required to secure the pipe clamp to a support member. In addition, the pipe clamp can only secure a pipe having a specific diameter. Sleeve inserts are required if a smaller diameter pipe is to be secured by the pipe clamp.

Therefore, a need exists for a pipe clamp which may be selectively affixed to a readily located support member without requiring additional fasteners or tools. A further need exists for a pipe clamp which completely encircles a pipe, wherein the clamp may secure to itself to provide a retention force independent of the elastic property of the pipe clamp. Also, the need exists for a readily reusable pipe clamp which may accommodate a variety of piping or tubing systems over a broad range of temperatures.

SUMMARY OF THE INVENTION

A reusable pipe clamp is disclosed, wherein the pipe clamp retains any diameter of piping or tubing within a predetermined range by selectively encircling the circumference of the pipe. The pipe clamp is adapted to selectively engage a support member without the use of additional fasteners or tools. A method for engaging a pipe clamp to a support bar and securing a pipe within the pipe clamp is also disclosed.

The present invention is used in conjunction with a support bar which spans open areas to provide a support structure for the pipe clamp. The support bar includes a plurality of evenly spaced apertures along the length of the bar. The pipe clamp comprises a base adapted to selectively engage the support bar without the use of additional fasteners or tools. The base includes a pair of colinear cammed feet and opposing clips. The pipe clamp may be operably engaged with the support bar by rotation of the pipe clamp relative to the bar so that the cammed feet are received within the apertures of the support bar and the clips contact the support bar. The pipe clamp includes a pipe gripper affixed to the base. The pipe gripper includes a strap having an interlocking tongue and fork on the strap ends which permit the pipe gripper to secure to itself about the periphery of a pipe and thereby retain the pipe. Preferably, the inside of the pipe gripper includes four ribs which extend parallel to and contact the length of pipe encircled by the pipe gripper. The contact of the pipe with the ribs of the pipe gripper allows the pipe clamp to accommodate the expansion and contraction of the pipe during temperature fluctuations.

Because the pipe clamp does not require additional fastening means to be secured to the support bar, the pipe clamp may be readily disengaged from the support bar without degrading subsequent performance. Further, the pipe clamp permits the selective disengagement of the pipe from the pipe clamp, so that the pipe may be readily removed from the pipe clamp without the use of tools. The ability of the pipe clamp to firmly encircle the pipe and to isolate the piping from the building framing eliminates the noise often associated with piping systems.

The disclosed pipe clamp may be manufactured from a variety of plastic resin compounds which permit the pipe clamp to meet specific building codes and standards. In addition, the variety of materials from which the pipe clamp may be constructed allows the pipe clamp to be used with piping of various materials such as metal, including copper, galvanized steel, aluminum, lead and plastic such as ABS, PVC, CPVC and PB.

Although the pipe clamp has been described for use with piping systems, the pipe clamp may also be used in connection with, but not limited to air-conditioning condensate lines, electrical conduits, gang wiring, drain, waste and vent lines for plumbing, and fire sprinkler systems as well as water supply lines.

BRIEF DESCRIPTION OF THE DRAWINGS

FIG. 1 is a perspective view of the present invention employed within a building structure showing a pipe secured by the pipe clamp.

FIG. 2 is a perspective view of the pipe clamp affixed to a support bar showing the pipe clamp in an open configuration.

FIG. 3 is a perspective view of the pipe clamp showing the back side of the clamp in an open configuration.

FIG. 4 is an overhead plane view of the pipe clamp engaged with a support bar.

FIG. 5 is a perspective view of the pipe and a support bar showing the engagement of the pipe clamp and the support bar by rotation of the pipe clamp.

FIG. 6 is a cross-sectional view taken along lines 6—6 of FIG. 4 showing the base of the pipe clamp operably engaged with a support bar.

DETAILED DESCRIPTION OF THE PREFERRED EMBODIMENT

Referring to FIG. 1, a pipe clamp 10 is shown in a typical application. Pipes P extend parallel to studs S and are therefore unsupported by the studs. Support bars 14 connect studs S proximal to an unsupported length of the pipe P.

The support bar 14 includes a plurality of equidistant apertures 16. Referring to FIG. 2, the preferable width W of the support bar 14 is approximately 0.625 the preferable thickness T is approximately 0.0625 inches. The bar 14 may be disposed at any particular height of the studs S so that the pipe clamp 10 may engage and support any particular section of the pipe P. The pipe clamp 10 engages the support bar 14 and the pipe P is retained within the pipe clamp 10, thereby preventing flexure of the pipe.

As shown in FIG. 2, the pipe clamp 10 includes a pipe gripper 20 affixed to a base 40. The pipe gripper 20 includes a generally arcuate strap 21 affixed to the base 40. The inner surface of the strap 21 includes a plurality of lateral ribs 32 which extend parallel to the axis of the loop formed by the strap 21, that is, the ribs 22 extend parallel to the length of pipe retained in the pipe clamp. Preferably, the strap 21 includes four ribs 32 which are equidistantly spaced along the strap. A securing prong 24 is affixed to one end of the strap 21. A guide prong 28 is spaced from and substantially parallel to the securing prong 24 so as to form a fork. Proximal to the free end of the guide prong 28 a lateral ridge 34

- g 28. extends across the surface of the guide prong affixed to the other end of the strap 21, and opposing the fork formed by the guide prong 28 and the securing prong 24, is a contact prong 22 which is spaced from and substantially parallel to a tongue 26. The tongue 26 is spaced from the contact prong 22 so that securing prong 24 may be received therebetween. The guide prong 28 is spaced from the securing prong 24 so that the tongue 26 may be received therebetween.

As shown in FIGS. 2, 3 and 4, the securing prong 24 includes a plurality of lateral teeth 25. The tongue 26 also includes a plurality of lateral teeth 27. One side of the prong 28 near its free end includes a transverse tab 38 which overhangs the inner surface of the prong and hence partially occludes the space between the guide prong 28 and the securing prong 24. The corresponding side of the tongue 26 also includes a transverse tab 36 which partially occludes the space between the tongue 26 and the contact prong 22.

Referring to FIG. 3, the base 40 has a substantially rectangular configuration. A pin 42, disposed at the center of the base 40, extends from the base 40 in opposition to the junction of the pipe gripper 20 and base 40. The pin 42 is sized to be slidably received within an aperture 16 of the support bar 14. The base 40 also includes fingers 52, 56 which are substantially colinear with the pin 42 and extend from opposite sides of the base 40. The finger 52 includes a foot 54 having a cammed surface 55. The finger 56 also includes a foot 58 having a cammed surface 59, wherein the cammed surface 59 opposes the direction of the cammed surface 55. The feet 54, 58 are sized to be received within the apertures 16 of the support bar 14 and are colinearly aligned with pin 42 along the midline on the base 40.

As shown in FIG. 3, the base 40 includes clips 44 and 48. Clip 44 includes a stop 45 which extends substantially perpendicular from the base 40 proximal to the periphery of the base. The stop 45 terminates a distance from the plane of the base 40. Referring to FIG. 2, clip 44 further includes a retainer 47 which extends perpendicular from stop 45, that is, substantially parallel to the base 40 so that the retainer 47 overlaps the base 40. The retainer 47 is spaced from the base 40 a distance approximately equal to the thickness T of the support bar 14. As shown in FIG. 6, the retainer 47 terminates at a free end approximately the midline M of the base 40. The common edge of the retainer 47 and the stop 45 are spaced from the pin 42 a distance approximately equal to the distance from an aperture 16 to the edge of the support bar 14.

Clip 48 includes a stop 49, which extends substantially perpendicular from the base 40 proximal to the periphery of the base. The stop 49 terminates a distance from the base 40. Clip 48 includes a retainer 51 which extends substantially perpendicular from the stop 49 and is substantially parallel to and spaced from the base 40. The retainer 51 is spaced from the base 40 a distance approximately equal to the thickness T of the support bar 14. The free end of the retainer 51 extends to the approximate midline M of the base 40. The common edge of the retaining portion 51 and stop 49 are spaced from the pin 42 a distance approximately equal to distance from an aperture 16 to the edge of the support bar 14. Therefore, the clip 44 is spaced from the clip 48 so that the width W of the support bar 14 may pass between the clips 44 and 48.

Preferably, the pipe gripper 20 and base 40 are integrally formed from a thermoplastic material or plastic resin compound which is flexible but yet provides sufficient rigidity and durability for use in its intended function. Alternatively, the pipe clamp 10 may be constructed from metal, and include a plastic shield to prevent electrolysis of dissimilar metals among the support bar, pipe clamp and retaining piping. The pipe gripper 20 is formed so that a slight bias causes the tongue 26 to contact the fork formed by the securing prong 24 and the guide prong 26. This bias is insufficient to cause the tongue 26 to be disposed between the guide prong 28 and the securing prong 24.

Although pipe P is shown in FIG. 1 as extending substantially parallel to studs S, the pipe clamp 16 may be employed when the pipe P is not parallel to a stud S. When the pipe P is not parallel to the studs S, the support bar 14 is secured to the studs so that the bar 14 is substantially perpendicular to the pipe P.

To operably engage the pipe clamp 10 with the support bar 14, the pipe clamp 10 is aligned so that the midline M of the base 40 is perpendicular to the equidistant apertures 16; that is, so that the fingers 52, 56 are away from the support bar 14. The center pin 42 is disposed within an aperture 16 of the support bar 14 as the width W of the bar 14 passes between the clips 44 and 48. Referring to FIG. 5 the pipe clamp 10 is then rotated about the center pin 42 relative to the support bar 14, so that retainers 47, 51 overlap the backside of the bar 14 and the cammed surfaces 55 and 59 contact the edge of the support bar 14. Further rotation of the pipe clamp 10 causes the cammed surfaces 55, 59 to flex the fingers 52, 56 from an unstressed configuration so that the bottom of the feet 54, 58 contact the support bar 14. Upon rotation of the pipe clamp 10 to a substantially parallel orientation with respect to the bar 14 so that the midline M is colinear with the apertures 16, the feet 54, 58 are forced into apertures 16 by the flexed fingers 52, 56, whereupon the fingers resume an unstressed configuration. As shown in FIG. 6 concurrent with the engagement of the feet 54, 58 within the apertures 16, the stops 45, 49 engage the edges of the support bar 14 to prevent further rotation of the pipe clamp 10 relative to the support bar 14. Reverse rotation of the pipe clamp 10 is prevented by engagement of the feet 54, 58 within aperture 16. Referring to FIG. 4, engagement of the thickness T of the bar 14 between the retainers 47, 51 and the base 40 prevents separation of the pipe clamp 10 from the support bar 14. Therefore, engagement of the pipe clamp 10 to the support bar 14 may be accomplished with one hand without requiring additional tools or fasteners.

As discussed supra, in the open configuration of the pipe gripper 20, the normal bias causes the tongue 26 to contact the open end of the fork formed by the free end of the guide prong 28 and the free end of the securing prong 24. The tongue 26 and contact prong 22 are separated from the guide prong 28 and securing prong 24 during the insertion of the pipe P within the pipe clamp 10. To achieve this separation, the pipe P is slid across the outer surface of the tongue 26 to engage the lateral ridge 34 of the guide prong 28. As the pipe P is further displaced along the outer surface of the tongue 26, the engagement of the ridge 34 and the pipe P causes the securing prong 24 and guide prong 28 to flex away from the tongue 26. When the guide prong 28 and securing prong 24 have been displaced a distance equal to the diameter of the pipe P, the pipe may pass between the free ends of the tongue 26 and guide prong 28 to be disposed within the strap 21. The circumference of the pipe P then contacts the ribs 32 of the strap 21.

Upon passage of the pipe P between the guide prong 28 and the tongue 26, the tongue 26 and guide prong 28 return to their unstressed configuration wherein the tongue 26 contacts the open end of the fork formed by the securing prong 24 and guide prong 28. The tongue 26 may then be disposed between the securing prong 24 and the guide prong 28 so that the teeth 25 of the securing prong 24 engage the teeth 27 of the tongue 26. As the tongue 26 is disposed between the securing prong 24 and the guide prong 28, the effective circumference of the strap 21 decreases until the strap 21 is secured about the pipe P. Withdrawal of the tongue 26 from within the guide prong 28 and securing prong 24 is prevented by engagement of the teeth 25 with the teeth 27.

Therefore, retention of the pipe P within the pipe clamp 10 requires only one hand to hold the pipe P as it causes the pipe clamp 10 to flex open. The securing of the tongue 26 between the guide prong 28 and the securing prong 24 also requires only one hand.

Torsion of the tongue 26 relative to the guide prong 28 and securing prong 24 is prevented by engagement of the tongue 26 with the transverse tab 38 and engagement of the securing prong 24 with the transverse tab 36. Therefore, the pipe clamp 10 will not prematurely open upon rotation of the pipe P relative to the pipe clamp 10.

Removal of the pipe P from the pipe clamp 10 is accomplished by disengaging the tongue 26 from within the securing prong 24 and the guide prong 28. To disengage the tongue 26, the guide prong 28 is flexed radially outward, that is, away from the tongue 26, so that the transverse tab 38 does not contact the tongue 26. Upon flexure of the guide prong 28, torsion of the tongue 26 relative to the securing prong 24 permits the tongue 26 to rotate in a direction towards the tab 36, that is parallel with the teeth 25, 27 until the teeth 25 no longer engage the teeth 27. The tongue 26 is removed from between the securing prong 24 and the guide prong 28. The pipe clamp 10 then assumes the configuration just subsequent to insertion of the pipe, that is, the free end of the tongue 26 contacts the open end of the fork formed by the securing prong 24 and the guide prong 28. The pipe P is then pulled away from the base 40 which causes the tongue 26 to flex away from the guide prong 28. Upon flexure of a distance equal to the diameter of the pipe P, the pipe passes between the tongue 26 and the fork, and is thereby removed from the pipe clamp 10.

Removal of the pipe clamp 10 from the support bar 14 is accomplished by flexing the fingers 52, 56 a sufficient distance so that the feet 54, 58 are disengaged from within the apertures 16. The pipe clamp 20 is then rotated approximately 90 to a perpendicular orientation relative to the support bar 14, whereupon the support bar 14 is no longer disposed between the base 40 and the retainers 47, 51. The pipe clamp 10 may be withdrawn from between the clips 49 and 48, and thereby separated from the support bar 14.

Although the present invention has been described in terms of particular embodiments, it is not limited to these embodiments. Alternative embodiments and modifications which would still be encompassed by the invention can be made by those skilled in the art, particularly in light of the foregoing teachings. Alternative embodiments, modifications or equivalents may be included within the spirit and scope of the invention, as defined by the claims.

I claim:

1. A pipe clamp, comprising:
   a base having lugs adapted to engage with a support bar in a manner to couple said base with said bar and prevent rotation of said base relative to said bar; and
   a pipe gripper affixed to said base, said gripper being sized to surround a substantial portion of a pipe, said gripper including a fork having a guide prong spaced from a securing prong, and a tongue being sized to secure between said guide prong and said securing prong.

2. The pipe clamp of claim 1, wherein said tongue includes a plurality of teeth, and said securing prong includes a plurality of teeth which engage said tongue when said tongue is disposed within said fork.

3. The pipe clamp of claim 1, wherein said lugs further prevent longitudinal movement of said base along said bar.

4. The pipe clamp of claim 1, wherein said pipe gripper is a strap-like element having a central portion rigidly affixed to said base, with two free ends which can be spread to receive said pipe, said fork being on one of said ends and said tongue being on other one of said ends.

5. The pipe clamp of claim 1, further comprising a contact prong spaced from and substantially parallel to said tongue. The space between said contact prong and said tongue being sized to receive said securing prong.

6. The pipe clamp of claim 1, wherein said pipe gripper includes a plurality of ribs adapted to contact a pipe retained within said pipe clamp.

7. The pipe clamp of claim 1, Wherein said base and said pipe gripper are integrally formed thermoplastic.

8. The pipe clamp of claim 7, wherein said pipe gripper has a sufficient thickness to exhibit flexural rigidity so as to bias said pipe gripper to a closed loop configuration.

9. A pipe claim, comprising:
a base having projecting structure to engage a support bar and prevent rotation of said base relative to said bar; and
a strap having a length to encircle a pipe to be retained in said pipe clamp, said strap having a fork disposed on a first end, and a tongue disposed on a second end of said strap, said tongue sized to be received in said fork, said strap affixed to said base between said fork and said tongue, wherein said fork and said tongue are movable between an open position for receiving a pipe and a closed position for encircling said pipe.

10. The pipe clamp of claim 9, wherein said fork is urged towards said tongue when said strap is in said open position.

11. A pipe clamp, comprising:
a base including a pin colinearly disposed between a first and a second foot, said first and said second foot sized to be received within apertures of a support bar, a first clip, and an opposed second clip for retaining said base on said bar in combination with said first and second foot, and
a pipe gripper affixed to said base said gripper being adapted to substantially encircle a pipe retained within said gripper.

12. The pipe clamp of claim 11, wherein said first and said second clips include a stop extending from said base, said stop terminating a distance from said base, and a retainer affixed to said stop and substantially parallel to said base.

13. The pipe clamp of claim 12, wherein said retainer is spaced from said base a distance approximately equal to the thickness a support bar.

14. The pipe clamp of claim 11, wherein said base further comprises a first and a second extending finger, said fingers being substantially colinear with said center pin, said first foot disposed on said first finger, said second foot disposed on said second finger, said first and said second fingers having a flexural rigidity to elastically deflect a distance equal to the height of said first and second foot.

15. The pipe clamp of claim 4, wherein said first foot and said second foot each include a cam surface to engage said bar to deflect said fingers.

16. The pipe clamp of claim 11, wherein said pipe gripper is affixed to said base opposed to said center pin.

17. The pipe clamp of claim 11, wherein said first and said second clips are separated by a distance greater than the width of a support bar.

18. A pipe clamp comprising:
one-piece molded plastic body having a base with a lower surface housing structure thereon adapted to mount the base on a flat elongated support bar having a plurality of substantially equally spaced apertures formed therein, said body further having a pipe gripper positioned on an upper surface of said base;
said base structure including
(a) a positioning pin to sized fit into an aperture on said bar,
(b) a pair of clips on opposite edges of said base, with said clips having retainer portions spaced to receive said support bar, with said pin being positioned in the hole in said support bar with the clamp oriented in an initial position, said clamp being rotatable to a position wherein opposite edges of said support bar are captured between said base lower surface and said retainer portions, said base structure further including cammed feet adapted to engage the edge of said support bar when the clamp is rotated to resiliently engage the surface of said support bar until the clamp is rotated to a position wherein the cammed feet are aligned with and snap into apertures in said support bar on adjacent apertures through which the positioning pin is located.

19. The claim of 18, wherein said pipe gripper includes strap portions extending outwardly from the upper surface of said base to encircle a pipe, said strap portions including inter engaging releasable teeth adapted to securely position the free ends of the strap so that the pipe is snugly held in position.

20. A pipe securing system, comprising:
a support bar; and
a pipe clamp comprising:
a base having structure projecting from one side to engage said support bar and to prevent rotation of said base relative to said bar; and
a pipe gripper affixed to and projecting from the other side of said base, said gripper being sized to surround a substantial portion of a pipe.

21. The system of claim 20 wherein said support bar is generally flat with width substantially greater than thickness, and includes a plurality of apertures along the length of the bar; and
said base structure includes lugs adapted to mate with said apertures.

22. The pipe clamp system of claim 21, wherein said lugs further comprise a center pin, a pair of feet colinearly aligned with said center pin and adapted to mate with said apertures, and a pair of spaced opposing clips fitted over the edges of said bar.

23. The pipe clamp system of claim 22, wherein said clips engage the edges of said bar by rotating said base around said center pin.

24. The system of claim 20 wherein said base has a generally flat rectangular configuration with a width about equal to the width of said bar, said gripper is a strap-like element which is openable to receive a pipe which extends perpendicular to said bar when said clamp is fixed on said bar.

25. The system of claim 20 wherein said bar has a generally flat rectangular configuration with a width about equal to the width of said bar, said base structure includes a first lug depending from one edge of said base and extending beneath the base, and a second lug depending from an opposite edge of said base and extending beneath an opposite edge of said bar, said lugs being spaced from each other an amount greater than the width of said bar in the direction between the ends of said base so as to permit the base to be positioned on said bar with the lugs straddling the bar and then rotated to a position where said lugs extend beneath the bar and thereby fix the clamp to the bar.

26. A pipe clamp, comprising:
a base adapted to be mounted on a support bar; and
a pipe gripper affixed to said base, said gripper being sized to surround a substantial portion of a pipe, said gripper including a tongue, and a fork having a guide prong spaced from a securing prong, said tongue being sized to be secured between said guide prong and said securing prong, said guide prong further comprises a transverse ridge proximal to a free end to said guide prong, said ridge adapted to engage a pipe to permit displacement of said guide prong from an unstressed position.

27. A pipe clamp, comprising:
a base adapted to be mounted on a support bar; and
a pipe gripper affixed to said base, said gripper being sized to surround a substantial portion of a pipe, said gripper including a tongue, and a fork having a guide prong spaced from a securing prong, said tongue being sized to be secured between said guide prong and said securing prong, said tongue including a first transverse tab and said guide prong includes a second transverse tab, wherein said first tab laterally contacts said securing prong and said second tab laterally contacts said tongue to prevent torsion of said tongue relative to said fork upon operably engagement of said tongue and said fork.

28. A pipe clamp, comprising:
a base adapted to be mounted on a support bar, wherein said base comprises a center pin, a pair of feet colinearly aligned with said center pin, and a pair of opposing clips; and
a pipe gripper affixed to said base, said gripper being sized to surround a substantial portion of a pipe, said gripper including a tongue, and a fork having a guide prong spaced from a securing prong, said tongue being sized to be secured between said guide prong and said securing prong.

* * * * *